Figure 7:
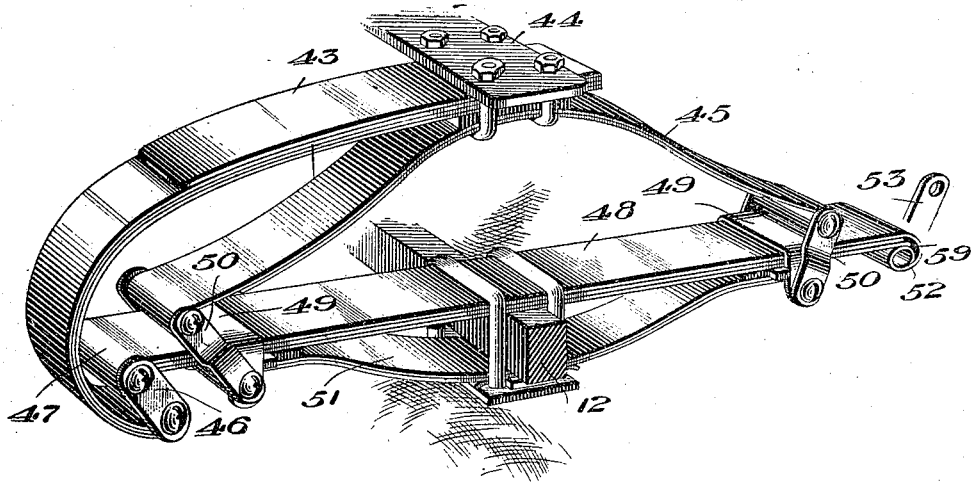

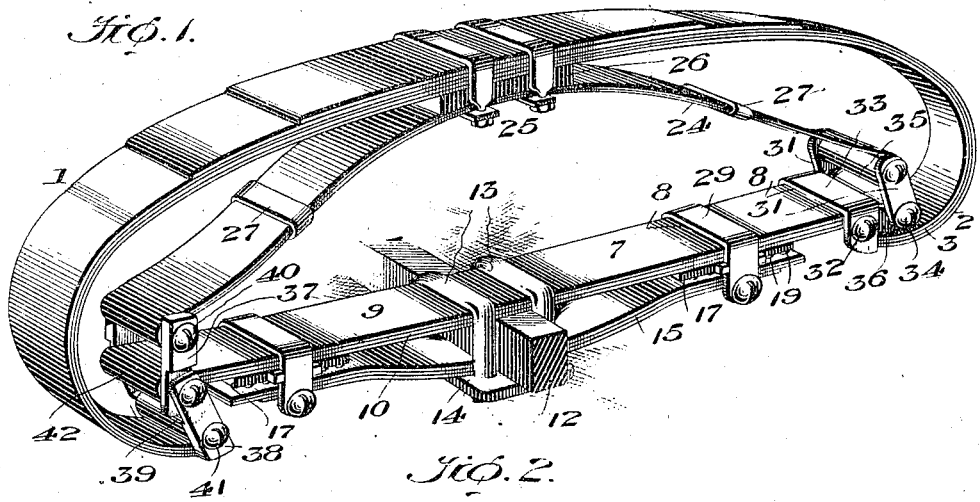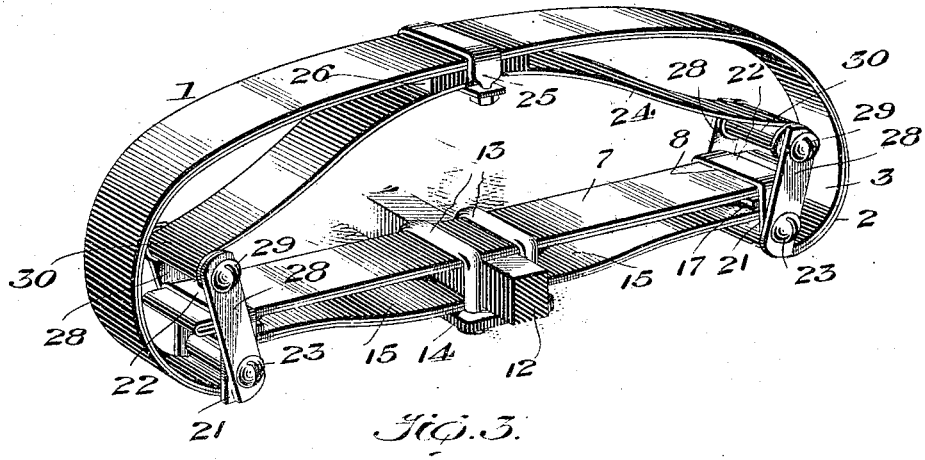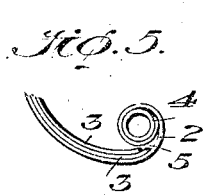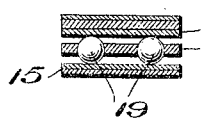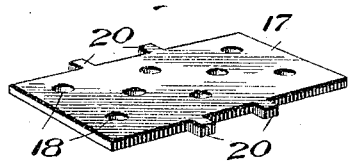

W. E. ANDREW.
SPRING STRUCTURE.
APPLICATION FILED SEPT. 4, 1914.

1,147,134.

Patented July 20, 1915.
3 SHEETS—SHEET 2.

Witnesses
Frank A. Kane

Inventor
William E. Andrew
By Edmund ———, attorney

W. E. ANDREW.
SPRING STRUCTURE.
APPLICATION FILED SEPT. 4, 1914

1,147,134.

Patented July 20, 1915.
3 SHEETS—SHEET 3.

Witnesses

Inventor
William E. Andrew
Frank A. Kane
By
Attorney

UNITED STATES PATENT OFFICE.

WILLIAM E. ANDREW, OF ATLANTIC HIGHLANDS, NEW JERSEY.

SPRING STRUCTURE.

1,147,134. Specification of Letters Patent. Patented July 20, 1915.

Application filed September 4, 1914. Serial No. 860,197.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Spring Structures, of which the following is a specification, reference being had therein to the accompanying drawing.

This invention relates to spring-structures, broadly.

The subject-matter of the present case constitutes an improvement upon the invention disclosed in Letters Patent No. 1,060,879, granted May 6, 1913, to me.

One object of this invention, similarly as in said patent, is to provide a spring-structure particularly well adapted for use in vehicles used on roads of more or less uneven surface and which would ordinarily produce sudden jolts and jars.

Another object within the contemplation of the present invention is to construct and apply this improved form of structure to vehicles, such as automobiles, and whereby the spring-suspension interposed between the vehicle-body and the axles is controlled in a more certain manner, in certain situations, than may be possible when my patented construction is employed and whereby, also, any sudden movement of the body, either upward or downward, will be prevented, so that liability of shocks, jars and the like, are precluded or at least reduced to a minimum.

It is therefore a feature of the invention so to construct and apply the spring-suspension thereof that any relative movement between the vehicle-body and the axles may be controlled in any position which the vehicle-body may assume, no matter how great may have been the suddenness or extent of flexure imposed upon the spring-instrumentalities.

A still further object of the invention is to provide improved means for positively controlling the relative movement between the body and axles of a vehicle in order that the use of so-called "shock absorbers," now extensively employed, may be entirely obviated.

A still further object is to provide a spring-suspension which is so constructed and arranged that all strains and stresses may be concentrated at a point where is provided a device which is well adapted instantly to transmit and distribute such strains and stresses throughout the entire structure, wherefore no single instrumentality thereof will be subjected to undue action.

Among the more important features of difference between my patented spring-structure and what is herein disclosed are, a simplification of the parts; the provision of means which obviate the necessity of building up some of the springs with differently dimensioned leaves; and the inclusion in such springs where more than a single leaf is employed of a plurality of leaves of substantially the same length, whereby the spring, in its entirety, has no single point of weakness.

The invention in general seeks to provide a spring-structure or suspension which, from an operative standpoint, possesses, in practical use, a high degree of efficiency and durability and which, from a structural standpoint, is of the greatest possible simplicity.

Some of the other objects and advantages of the invention will in part be obvious from the annexed drawings, while other objects and advantages will in part be pointed out in the following description.

The invention resides broadly in various novel features of construction, in a new combination of elements, in the arrangement of the parts, and in a novel aggroupment thereof for coaction, all as will be exemplified in the construction hereinafter set forth, and the scope of application of which will be indicated in the claims hereto appended.

In order that this invention may be clearly comprehended by those skilled in the art, drawings illustrating some of the many possible utilizations of the same are hereto appended as a part of this disclosure. But it will be manifest that other possible utilizations and embodiments, employing the underlying principles of the invention, will fall within the spirit thereof and within the objects and advantages contemplated thereby.

Figure 8:
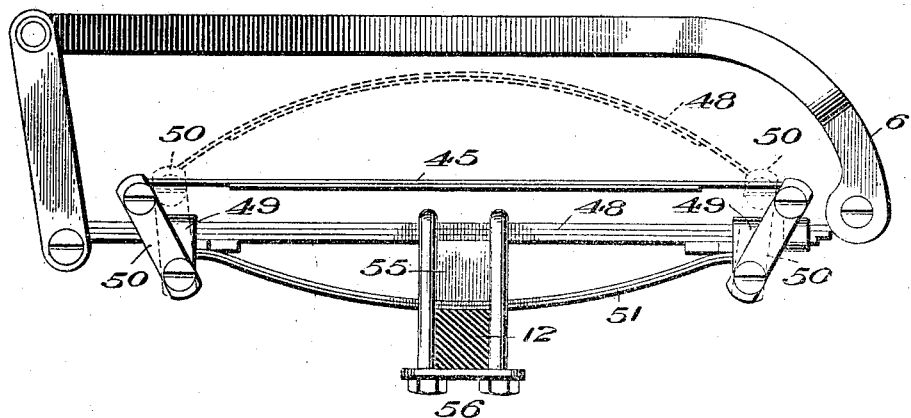
Figure 9:
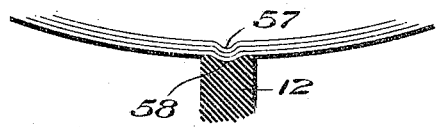
Figure 10:
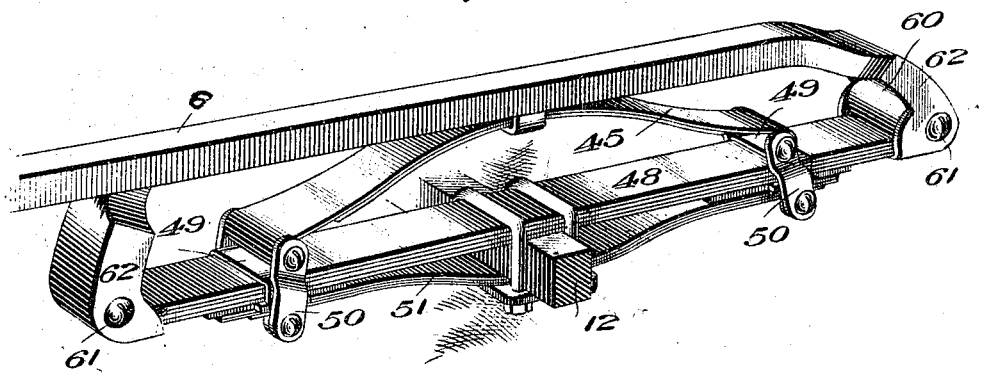
Figure 11:
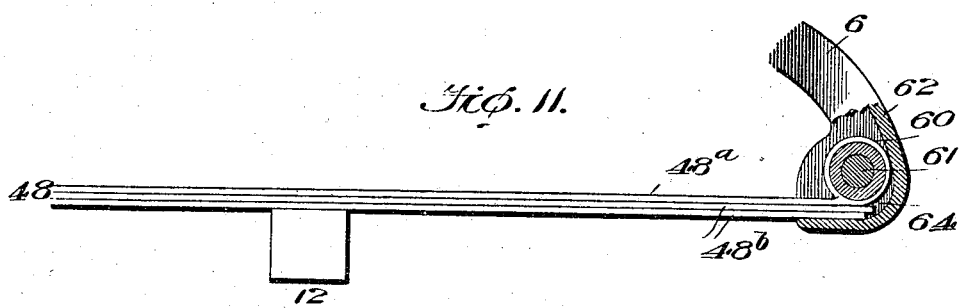
Figure 12:
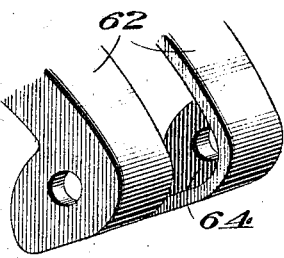

In the accompanying drawings, Figure 1 is a view in perspective of a spring-structure constructed in accordance with my invention; Fig. 2 is a similar view of a modified form of the invention; Figs. 3, 4, 5 and 6 are views in section, in perspective, in elevation and in section, respectively—and, in some instances, fragmentary—of certain parts of the forms of devices shown in Figs. 1 and 2; Fig. 7 is a view in perspective of another modification of the invention and having the same embodied in a so-called "three-quarter scroll" form of spring-structure; Fig. 8 is a view in elevation, partly in section, of the invention in a still further modified form; Fig. 9 is a fragmentary view, in detail, of three leaves of a spring formed to retain each other against a longitudinal shifting movement; Fig. 10 is a view in perspective of another modification and embodiment of the invention; and Figs. 11 and 12 are fragmentary views, in sectional elevation and in perspective, respectively, of certain parts of the device of Fig. 10.

In the several embodiments of my invention, as herein disclosed and contemplated, it is to be understood that there will be a plurality of elements aggrouped in a peculiar and novel manner. Essentially, one of these will comprise a spring; another will reside in a spring-controlling or equalizing device preferably connected to the spring and (desirably) under tension when in normal, operative position; and another will be a support or sustaining-instrumentality, either in the form of a spring, in the form of a bar or arm, or in any other appropriate form, according to the manner or utilization of my spring-suspension, or according to its particular application to a vehicle.

Referring to the drawings, and more particularly to the embodiments illustrated in Figs. 1 to 6, it will be noted that the reference-character 1 designates, generally, the sustaining-instrumentality, aforementioned, and which in this instance is shown, by way of example, as a spring comprising a plurality of leaves, at least two of which, 2 and 3, are preferably of substantially the same length. The outermost leaf 2, preferably and as shown, terminates in a loop or eye 4, to constitute a pivot-receiving or bearing end, for a purpose presently to be explained. The second leaf 3 (and possibly other of the leaves) will terminate at this bearing-end, but without extending entirely into the loop or eye 4. By this arrangement, and as clearly shown in Fig. 5, the ends of the leaves 3 terminate in the space 5 formed between the external surface of the eye or loop 4 and the inner wall or surface of the curved portion of the outermost leaf 2. The arrangement is such that the several leaves will remain in contacting relation, both normally and when the spring is flexed; the space 5, aforementioned, at the bearing-end of the outermost leaf permitting slight longitudinal movement of one leaf in relation to the other without effecting or permitting the separation of such leaves. In practice, it has been found that when a spring is built up of several leaves, of relatively different length, the point of greatest weakness of the entire spring-suspension is located where the leaves terminate at positions remote from the bearing-end or ends thereof.

In lieu of the sustaining-instrumentality being in the form of a spring, as just described, it may constitute a part of the vehicle and be in the form of an arm 6, such as is illustrated in Figs. 8 and 10.

Underlying or overlying the sustaining-instrumentality, 1—as the case may be, according to the particular application of my improved spring-structure in the vehicle—is a primary member or spring-device 7, preferably constructed of a plurality of leaves of substantially the same length up to a point beyond the bearing-end 8. In this instance, and by way of example, the primary member 7 is substantially flat, it is elongated, and it occupies a relatively horizontal position with respect to various parts of the vehicle to which my spring-suspension is applied. Moreover, it comprises, in this example, two leaves 9 and 10; the upper leaf 9 being bent, at its ends, around the ends of the lower leaf 10, there being a space 11 provided for any slight longitudinal movement of the leaf 10 with respect to the leaf 9, as shown in Fig. 6.

The primary spring 7 may, in certain of the embodiments, be attached to a vehicle-axle 12 in any suitable manner. In the form shown by way of example in Figs. 1 and 2, the securing means employed comprises a pair of clips 13 extending through a plate 14 which engages the underside of the axle 12.

Underlying the primary member or spring 7 is a secondary or auxiliary spring or instrumentality 15 secured to the axle by the clips 13 and plate 14 similar to the securement thereto of the primary spring. This secondary spring preferably comprises a plurality of leaves 16 of substantially the same length. By reason of the fact that the secondary spring occupies a position on the side of the axle 12 opposite to the primary spring, it is bowed away therefrom; the axle, in this instance, constituting a spacing means or member to maintain these two springs in spaced relation at a point intermediate of their ends.

As there is more or less relative movement between the primary and secondary springs, means are preferably provided not only to maintain the ends of the secondary spring also in spaced relation to the primary spring but, also, to reduce wear and friction therebetween. Such means may be of any suitable form; but, in this instance, I elect to provide a spacing-plate 17 of appropriate dimensions, material and form, and provided with perforations 18 of sufficient size to contain a lubricant (not shown) or antifriction rolling-elements shown, in this instance, as balls 19.

The plate 17 is formed at opposite sides with a pair of lugs or ears 20 sufficiently spaced to receive the pendant portions 21 of a bracket or yoke-member 22 which is sustained by and slidable on the primary member 7. The pendant portions are connected by a headed spindle or bolt 23 which, in conjunction with the bracket, holds the ends of the secondary spring and the sliding-plate 17 in close relation to the underside of the primary spring 7. The construction and relation of these parts is such that the bracket is permitted to have a slight lengthwise shifting movement on the primary spring and, with it, the lubricant or ball-bearing plate 17.

Overlying the primary spring and bowed away therefrom in a direction opposite to that of the secondary spring 15 is a controlling or equalizing instrumentality 24, which in this instance is shown as a spring and which normally occupies a spaced relation to the primary spring. To maintain the same in such spaced relation, means are provided of appropriate form and dimensions: In the embodiments illustrated, by way of example, in Figs. 1 and 2, such means include a clip-and-plate device 25 which embraces the controlling instrumentality and the sustaining spring 1 intermediate of their ends. The controlling and sustaining springs are preferably spaced centrally by a block 26, as shown.

The controlling instrumentality or spring 24 may consist of a single band or leaf, as shown in Fig. 2, or a plurality of leaves, as shown in Fig. 1, in which instance the leaves are held together by clips 27. Where only the single band is utilized, dependence is had upon the inherent resiliency thereof to perform its equalizing function (as hereinafter explained) with reference to the different parts of the structure; but, if such equalizing function requires to be augmented, this is accomplished by adding a sufficient number of the leaves (of a predetermined degree of strength and pulling or drawing power) to the equalizer.

By the interposition of the controlling and equalizing device 24 between the sustaining-instrumentality 1 and the primary spring 7, by forming said equalizing device with predetermined tension, and by constructing and arranging the parts as shown, so that said device will be under constant tension when in normal position (that shown in Figs. 1 and 2, for instance) it has an inherent and normal tendency to flatten out or assume a straightened condition and, therefore, normally tends to cause the instrumentality (to which it is clipped) to have a downward tendency and at the same time to control the upward movement of the sustaining instrumentality.

In this construction, as now will be seen, I provide a spring equalizing device with a normal tendency to flatten out in the direction of the downward movement of the vehicle-body and reversed to the direction of the upward movement thereof, wherefore said device involves a structure the natural tendency of which is to pull the vehicle-body downwardly. This pulling tendency is, however, controlled in part by the primary spring 7 and more especially and effectually by the secondary spring 15 whose function is to counteract against said controlling instrumentality at predetermined points in its movement.

Preferably and as shown, the sustaining spring 1 is curved so as to encompass the controlling spring, and has its ends extended into a plane below the normal position of the primary and secondary springs.

At certain times in the action of the structure, the stress of the load is concentrated at a point in the system and then transmitted from one or another of the instrumentalities and distributed to others. Means are provided for effecting such transmission and distribution and, include the following construction: Referring more especially to Fig. 2, the bolt 23 in the pendant portion 21 of the bracket 22 extends through the eye or loop 4 at each curved end of the sustaining-instrumentality 1 and constitutes a bearing or pivot therefor. Fulcruming on said bolts 23, at each end of said instrumentality, and at opposite sides of the bracket, is a pair of links 28. Connecting the upper ends of each pair of these links is a bolt or headed pin 29 upon which is supported the bearing-portion 30 of the controlling-instrumentality 24. Normally, these links occupy a position at a slight angle to the vertical. When, however, the spaced relation of the primary and sustaining instrumentalities is changed, these links rock on their fulcra 23, and this produces a tendency of the brackets to have a sliding movement on the primary member. This tendency is, however, more or less resisted by the curved underlying portions of the sustaining spring 1 which are stressed by the movement of the brackets and to them is transmitted, in part at least, the load. This is when the sustaining member is being depressed and, with it, the equalizing member. When, however, the sustaining member begins an upward, recoiling or rebounding movement, the links will similarly be caused to rock on their fulcra to stress the equalizing-spring 24 which, in turn, effects a tendency of the brackets to slide inwardly on the primary spring 7, but which tendency, as already explained, is resisted by the curved portions of the sustaining-member 1, to which the load is thereupon transferred.

It is not to be understood that the curved portions of the sustaining-member 1 continue to carry the load, since this is, by the inherent coaction of the parts, distributed throughout the entire system of spring-instrumentalities by the relative movement caused thereto and effected through the brackets, links, etc. In this arrangement, as exemplified in Fig. 2, I have dispensed with the use of shackles, such as are shown at the left side, in the device illustrated in Fig. 1; the bracket, links, etc., of Fig. 2, and also shown at the right in Fig. 1, acting, not as shackles, but as transmitting and distributing instrumentalities.

Referring, now, to the embodiments disclosed in Fig. 1—which includes two forms of connecting devices between the sustaining member, the primary member and the controlling member—and to the connecting device shown at the right hand side, as aforementioned, it will be seen that the links 31 are not fulcrumed upon the bracket-carried bolt 32, in the supplemental bracket 33, but rock upon a fulcrum 34 which extends through an eye 35 formed at each end of the primary member 7. The upper ends of the links 31 are connected to the controlling spring 24 in the same manner as described in connection with the device of Fig. 2. Fast on the pivot 34—or formed integral with the links 31—are arms 36 adapted to engage the edges of the bracket so that movement of the controlling spring 24 will, through the links 31 and arms 36, effect a sliding movement of the brackets 33 inwardly which operation, in turn, stresses the curved portions of the sustaining-member 1, as already described in connection with the device of Fig. 2. In this instance, the brackets 33 have a sliding movement independent of the brackets 29 which are caused to have a sliding movement by the relative movement between the primary and secondary springs 7 and 15, respectively. In this Fig. 1, at the left hand side, is shown a shackle device for connecting the sustaining-member, the primary member, and the controlling member. This shackle device includes, at each side of these members, a pair of links 37 and 38 pivotally connected at 39 for relative movement. The controlling spring 24 is connected to the links 37 through the bolts 40; while the underlying portions of the sustaining spring 1 are connected to the links 38 through the bolts 41. The fulcrum 39 of the links 37 and 38 extends through an eye 42, there being an eye at each end of the primary spring 7. I do not claim for this shackle device the same degree of efficiency, certainty and ease of operation of transmission and distribution of load and stress that, in practice, has been demonstrated in connection with the bracket-and-link device shown in Fig. 2.

In Fig. 7, there is shown a modified form of structure: In this particular embodiment, I have utilized, for the most part, the features of the embodiment illustrated in Fig. 2; but, in embodying my invention in a so-called "three-quarter scroll" spring suspension, I have found it advantageous to make certain changes. In this instance, the sustaining spring 43 is connected to the vehicle bracket 44 at one end, and, at the same point, to the controlling spring 45; while, at the other end, said sustaining-spring is, by a link connection 46, connected to an eye 47 formed at each end of the primary spring-member 48. The portion of the primary member which carries the eye extends beyond a sliding bracket 49 carried by the primary spring 48 and which, through the links 50, forms a connection between this primary spring 48, the secondary spring 51 and the controlling spring 45. In this instance, this connecting device, including the bracket, links and eyes, is of a form similar to that illustrated in Fig. 2. However, in this particular embodiment, there is no connection between the connecting links 46 and the sliding bracket 49. When the load causes a downward movement of the controlling spring 45, the latter rocks the links 50 on their respective fulcra and causes a sliding movement of the bracket inwardly only very slightly. When however the controlling spring begins its upward, recoil-preventing movement, it rocks the links in the opposite direction and the secondary spring 51 counteracts such movement only in so far as it may be essential to prevent said controlling spring from becoming too widely spaced from the primary spring. In this embodiment, the end of the primary spring 48 opposite to that to which the links 46 are connected is provided with an eye 52 attached to a bolt, (not shown), in which is attached a pair of links, of which one, 53, is shown, and which links, in turn, are attached to the chassis frame of the vehicle body (not shown).

In the modified form of structure illustrated in Fig. 8, my invention is disclosed as constructed for the front spring of a vehicle, as distinguished from the form required for the rear spring thereof, the type of which is illustrated in Fig. 7: In this instance, the primary spring 48 carries the sliding bracket 49 at a point somewhat remote from its eye-provided ends. Attached to these eye-provided ends is the usual chassis frame 6. The equalizer spring 45 is shown in the position it occupies before it is attached to a part of the vehicle body, in the manner already explained, and in which position it occupies the spaced relation to the primary spring 48 shown in dotted lines in this figure. When the spring 48 is bowed, as shown in dotted lines, the links 50 are swung from the position shown in full lines to the position shown in dotted lines. In this particular embodiment, I have shown the secondary spring 51 held in spaced relation to the primary spring 48 by a block or bar 55, the axle 12, in this instance, being shown as below the secondary spring 51. In other words, in this particular exemplification of my invention, the means for spacing the secondary spring 51 from the primary spring 48 is not the axle 12 but resides in the block 55. The axle, secondary spring 51 and block 55 are retained in position by a clip-and-plate device 56 of a construction similar to that shown in Figs. 1 and 2 but of somewhat greater dimensions.

It is a feature of my invention to so connect the parts, by the devices already described, that it is unnecessary to perforate the spring-leaves which, of necessity, greatly weakens them. Where bolt-holes are usually made in the leaves to receive bolts, the latter have for their function to prevent a shifting movement of the different leaves relatively. I have found that an effective measure for accomplishing the same result without perforating the leaves is, as shown in Fig. 9, to provide each leaf with an offset 57, the offsets in the different leaves registering with each other. Where such offsets are contiguous to the axle, the latter can be provided with a groove 58 to receive the offset portion of the lowermost spring-leaf, as shown. Obviously, when this feature is incorporated in other of the springs, the offsets could be in a direction opposite to that shown in Fig. 9.

In the embodiment illustrated in Figs. 10, 11 and 12, the form of spring-suspension illustrated is similar to that shown in Figs. 7 and 8. In this instance, the construction of the eyes formed at the end of the primary spring 48 is somewhat modified: In this exemplification of my invention, instead of the uppermost leaf 48ᵃ of the spring being bent downwardly—as shown at the right hand side in Fig. 7, wherein is provided a housing space 59 to receive the ends of the underlying spring-leaves and thereby dispense with clips and the like to hold them together—it is bent upwardly to form an eye 60 to receive a pivot 61 that extends through side plates 62 attached to or integral with the chassis frame 6. By this construction, the leaves 48ᵇ which underlie the ends of the leaves 48ᵃ are housed, not in the manner already described, but in the space 64, Fig. 11, formed in the plates 62. A feature of this construction is that the primary spring 48 can have a yielding movement notwithstanding the fact that its two ends are connected to an unyielding frame 6; and this follows from the fact that the eye 60, as shown in Fig. 11, moves in a clockwise direction and, thus, lengthens out, so to speak, the metal of the spring 48 to permit such yielding movement.

In the several embodiments described above, it will be understood that the load of the vehicle will cause the sustaining spring 1 to flex and this in turn flexes the equalizer spring, which then has, as one of its functions, a load carrying capacity. At the same time, the sustaining-spring 1 assumes part of the load and the stresses produced thereby will, in the manner already explained, be transmitted and distributed so that the weight of the superposed load and parts will flex the primary spring 7. During the return movement of the parts, the equalizer will control the same, obviously, and such control is augmented by the secondary spring. This results in an easy and gradual upward movement of the structure supported on the spring-suspension, and sudden recoil thereof is controlled nicely and absolutely. The attachment of the secondary spring to the other parts is such that, whatever load conditions produce stresses throughout the system of connected instrumentalities, the connecting devices which unite these instrumentalities for coaction so control their movements that, when such instrumentalities have imposed upon them the stresses, they cannot suddenly react to produce sudden movements in them and, thus, in other parts.

From the foregoing, it will be perceived that I have succeeded in devising a spring-structure which is well adapted to achieve the several objects and advantages in view. The structure, in all of its embodiments, is simple and compact in form, is particularly well suited for road vehicles like automobiles, and the parts of which it is formed are so constructed as to permit of its ready application to existing vehicles.

As many changes can be made in the different constructions exemplified herein, and as many other widely different embodiments of the invention can be made without departing from the spirit thereof, it is intended that all matter contained in the foregoing description and shown in the accompanying drawings shall be interpreted as illustrative and not in a limiting sense; and that the language used in the appended claims is intended to cover not only the specific features of the invention, but, also, the generic features thereof.

What I claim is:

1. A spring-structure for vehicles including a primary member, a vehicle-connected spring normally spaced from the primary member and having a movement toward and away from the primary member, a controlling spring-member interposed between the primary and secondary members and constantly under tension whereby recoil of the vehicle-body is controlled in any position it may assume and having a normal tendency to effect a pulling movement upon said vehicle-connected spring, a secondary spring juxtoposed to said primary member on the side of the primary member opposite from the controlling spring member and bowed away therefrom to effect counteraction on said controlling spring, and connections between said springs.

2. A spring suspension including a primary spring, a secondary spring underlying and bowed away from the primary spring, a controlling spring bowed away from the primary spring in a direction opposite to that of the secondary spring, a sustaining spring encompassing said controlling spring, and means for transmitting a tensioning action on said secondary and sustaining springs when said primary spring is stressed.

3. A spring suspension including a substantially flat primary spring, a secondary spring underlying and bowed away from the primary spring, a controlling spring bowed away from the primary spring in a direction opposite to that of the secondary spring, a sustaining spring encompassing said controlling spring, and means for transmitting a tensioning action on said secondary and sustaining springs when said primary spring is stressed.

4. A spring suspension including a primary spring, a secondary spring bowed away therefrom, a controlling spring also bowed away from the primary spring and in the direction opposite to the secondary spring, a sustaining spring encompassing said controlling spring and extending under the primary and secondary springs, and means interposed between said springs for transmitting a tensioning action to said secondary and sustaining springs when said primary spring is stressed.

5. A spring suspension including a primary spring, a secondary spring bowed away therefrom, a controlling spring also bowed away from the primary spring and in the direction opposite to the secondary spring, a sustaining spring encompassing said controlling spring and extending under the primary and secondary springs, and means interposed between said springs for transmitting a tensioning action to said secondary and sustaining springs when said primary spring is stressed in one direction and a tensioning action to said controlling spring when the primary spring is stressed in the opposite direction.

6. A spring suspension including a primary spring, a secondary spring bowed away from the primary spring, a controlling spring also bowed from the primary spring in a direction opposite to that of the secondary spring, a sustaining spring juxtaposed to said primary and secondary springs and bent to extend thereunder, and means connected to said springs for transmitting a tensioning action on one of said springs when said primary spring is stressed under load conditions.

7. A spring suspension including a primary spring, a secondary spring bowed away from the primary spring, a controlling spring also bowed from the primary spring in a direction opposite to that of the secondary spring, a sustaining spring juxtaposed to said primary and secondary springs and bent to extend thereunder, and means connected to said springs for transmitting a tensioning action on one of said springs when said primary spring is stressed under load conditions including a bracket slidably carried by the primary spring, a link pivotally connected thereto, and connections between said bracket, link and springs.

8. A spring suspension including a primary spring, a secondary spring bowed away from the primary spring, a controlling spring also bowed from the primary spring in a direction opposite to that of the secondary spring, a sustaining spring juxtaposed to said primary and secondary springs and bent to extend thereunder, and means connected to said springs for transmitting a tensioning action on one of said springs when said primary spring is stressed under load conditions including a bracket slidably carried by the primary spring, a rocking link pivotally connected thereto, and connections between said bracket, link and springs.

9. A spring suspension including a primary spring, a secondary spring bowed away from the primary spring, a controlling spring also bowed from the primary spring in a direction opposite to that of the secondary spring, a sustaining spring juxtaposed to said primary and secondary springs and bent to extend thereunder, and means connected to said springs for transmitting a tensioning action on one of said springs when said primary spring is stressed under load conditions including a bracket slidably carried by the primary spring, a rocking link pivotally connected thereto and normally lying at an angle to the vertical and movable to a greater angle in relation thereto when said springs are flexed and said bracket slides on the primary spring, and connections between said bracket, link and springs.

10. A spring structure for vehicles including a primary spring member, a vehicle-connected spring spaced from the primary member and normally tensioned to bear a load greater than that of the vehicle to which it is attached, a controlling spring interposed between the primary member and the vehicle-connected spring and having a normal tendency to hold said vehicle-connected spring in position to be unaffected by a load greater than that for which said spring is tensioned and also to equalize the action of said vehicle-connected spring when either said primary member or said vehicle-connected spring is stressed, and a secondary spring on the side of the primary spring member opposite from that of the controlling spring.

11. A spring-structure including a primary spring-instrumentality, a secondary spring-instrumentality having its ends disposed in relatively close relation to the primary spring-instrumentality, means for substantially spacing said primary and secondary spring-instrumentalities intermediate of their ends, a controlling spring-instrumentality normally spaced from said primary instrumentality, and disposed at the side thereof opposite to said secondary spring-instrumentality, and means for connecting said controlling-instrumentality to said primary spring-instrumentality.

12. A spring-structure including a sustaining-instrumentality, a primary spring-instrumentality, a secondary spring-instrumentality having its ends sustained in relatively close relation to said primary spring-instrumentality, means for substantially spacing said primary and secondary spring-instrumentalities intermediate their ends, a controlling spring-instrumentality disposed at the side of said primary instrumentality opposite to said secondary spring-instrumentality, and means for connecting said controlling spring-instrumentality to said sustaining-instrumentality to maintain said controlling spring-instrumentality in a substantially spaced relation to said primary spring-instrumentality.

13. A spring-structure including a sustaining-instrumentality, a primary spring-instrumentality, a secondary spring-instrumentality having its ends sustained in relatively close relation to said primary spring-instrumentality, means for substantially spacing said primary and secondary spring-instrumentalities intermediate their ends, a controlling spring-instrumentality disposed at the side of said primary-instrumentality opposite to said secondary spring-instrumentality, and means for connecting said controlling spring-instrumentality to said sustaining-instrumentality to maintain said controlling spring-instrumentality in a substantially spaced relation to said primary spring-instrumentality, and means for connecting said controlling spring-instrumentality at its ends to said primary-instrumentality at a point remote from its point of connection with said sustaining-instrumentality.

14. A spring-structure including a primary spring-instrumentality, a secondary spring-instrumentality having an intermediate portion disposed in spaced relation to said primary spring-instrumentality, means for maintaining said instrumentalities in spaced relation, a controlling spring-instrumentality normally spaced from said primary-instrumentality on the side of the primary spring-instrumentality opposite from the secondary spring-instrumentality, means for connecting said controlling-instrumentality with said primary spring-instrumentality and having a sliding movement in relation thereto, a sustaining-instrumentality, and means for connecting said controlling-instrumentality thereto to maintain it in spaced relation to said primary-instrumentality.

15. A spring-structure including a primary spring-instrumentality, a secondary spring-instrumentality having an intermediate portion arranged in spaced relation to said primary spring-instrumentality, a controlling spring-instrumentality arranged in spaced relation to said primary spring-instrumentality on the side of the primary spring-instrumentality opposite from the secondary spring-instrumentality, a sustaining-instrumentality, means for connecting-instrumentality, means for connecting said controlling spring-instrumentality to said sustaining-instrumentality to maintain it normally in spaced relation from said primary-instrumentality, and connecting-devices sustained by said primary spring-instrumentality and including a slidable element and a rocking element to which said controlling spring-instrumentality is attached.

16. A spring-structure including an elongated primary spring-instrumentality, an elongated secondary spring-instrumentality having an intermediate portion arranged in spaced relation to said primary-instrumentality, means for maintaining said instrumentalities in spaced relation, an elongated controlling spring-instrumentality arranged in normally spaced relation to said primary and secondary instrumentalities on the side of the primary spring-instrumentality opposite from the secondary spring-instrumentlity, a sustaining-instrumentality, means for connecting said controlling spring-instrumentality to said sustaining-instrumentality to maintain the former in spaced relation to the primary spring-instrumentality, connecting devices adjacent the opposite ends of said primary spring-instrumentality and slidable thereon and including a rocking element connecting said controlling spring-instrumentality to said primary spring-instrumentality.

17. A spring-structure including an elongated primary spring-instrumentality, an elongated secondary spring-instrumentality having an intermediate portion arranged in spaced relation to said primary-instrumentality, means for maintaining said instrumentalities in spaced relation, an elongated controlling spring-instrumentality arranged in normally spaced relation to said primary and secondary instrumentalities on the side of the primary spring-instrumentality opposite from the secondary spring-instrumentality, a sustaining-instrumentality, means for connecting said controlling spring-instrumentality to said sustaining-instrumentality to maintain the former in spaced relation to the primary spring instrumentality, connecting devices adjacent the opposite ends of said primary spring-instrumentality and slidable thereon and including a rocking element connecting said controlling spring-instrumentality to said primary spring-instrumentality, and means for connecting said sustaining-instrumentality to said connecting-devices.

18. A spring-structure including an elongated primary spring-instrumentality, an elongated secondary spring-instrumentality having an intermediate portion arranged in spaced relation to said primary-instrumentality, means for maintaining said instrumentalities in spaced relation, an elongated controlling spring-instrumentality arranged in normally spaced relation to said primary and secondary instrumentalities on the side of the primary spring-instrumentality opposite from the secondary spring-instrumentality, a sustaining-instrumentality, means for connecting said controlling spring-instrumentality to said sustaining-instrumentality to maintain the former in spaced relation to the primary spring-instrumentality, connecting-devices adjacent the opposite ends of said primary spring-instrumentality and slidable thereon and including a rocking element connecting said controlling spring-instrumentality to said primary spring-instrumentality, and means for attaching said sustaining-instrumentality to said connecting-devices at the side of the primary instrumentality opposite to the point of connection of said controlling spring-instrumentality to said primary spring-instrumentality.

19. A spring-instrumentality including a primary spring-instrumentality, a secondary spring-instrumentality having an intermediate portion arranged in spaced relation to said primary spring-instrumentality, a controlling spring-instrumentality disposed normally in spaced relation to said primary spring-instrumentality on the side of the primary spring-instrumentality opposite from the secondary spring-instrumentality, a sustaining instrumentality, means for connecting said controlling spring-instrumentality to said sustaining instrumentality to maintain the former in spaced relation to said primary spring-instrumentality, and a connecting device including a slidable element carried by said primary spring-instrumentality, a swinging element arranged in juxtaposition to said slidable element, means for connecting said controlling spring-instrumentality to said swinging element, and means common to said slidable and swinging elements and to said sustaining instrumentality for connecting the latter to said primary spring-instrumentality.

20. A spring-instrumentality including a primary spring-instrumentality, a secondary spring-instrumentality having an intermediate portion arranged in spaced relation to said primary spring-instrumentality, a controlling spring-instrumentality disposed normally in spaced relation to said primary spring-instrumentality on the side of the primary spring-instrumentality opposite from the secondary spring-instrumentality, a sustaining instrumentality, means for connecting said controlling spring-instrumentality to said sustaining instrumentality to maintain it in spaced relation to said primary spring-instrumentality, a connecting device including a slidable element carried by said primary spring-instrumentality, a swinging element arranged in juxtaposition to said slidable element, means for connecting said controlling spring-instrumentality to said swinging-element, means common to said slidable and swinging elements and to said sustaining instrumentality for connecting the latter to said primary spring-instrumentality, and means interposed between said primary and secondary instrumentalities for facilitating movement between their ends.

21. A spring-instrumentality including a primary spring-instrumentality, a secondary spring-instrumentality having an intermediate portion arranged in spaced relation to said primary spring-instrumentality, a controlling spring-instrumentality disposed normally in spaced relation to said primary spring-instrumentality on the side of the primary spring-instrumentality opposite from the secondary spring-instrumentality, a sustaining instrumentality, means for connecting said controlling spring-instrumentality to said sustaining instrumentality to maintain it in spaced relation to said primary spring-instrumentality, a connecting device including a slidable element carried by said primary spring-instrumentality, a swinging element arranged in juxtaposition to said slidable element, means for connecting said controlling spring-instrumentality to said swinging-element, means common to said slidable and swinging elements and to said sustaining instrumentality for connecting the latter to said primary spring-instrumentality, and means interposed between said primary and secondary instrumentalities for facilitating movement between their ends and including rolling elements and means for holding said rolling elements in operative position.

22. A spring structure including a primary spring, a secondary spring arranged in spaced relation to said primary spring, means for maintaining said springs in spaced relation including a spacing-element interposed therebetween adjacent their middle portions, a shiftable plate interposed between the springs adjacent the end of one of them, a spring-connecting bracket embracing said plate, a controlling spring instrumentality on the side of the primary spring opposite from the secondary spring, and means for connecting said instrumentality to said bracket including links and pivots extending therebetween.

23. A spring structure including an elongated, normally flat, primary spring comprising a plurality of leaves, a secondary spring lying in substantially the same vertical plane as the primary spring, means for spacing said springs adjacent their central portions, friction-preventing means interposed between said springs adjacent the end of one of them and spacing said springs relatively, a bracket slidably carried by said prmary spring and embracing said friction-preventing means, links pivoted on said bracket and extending above the same, and a controlling spring overlying said primary spring and connected to said links.

24. A spring structure including an elongated, normally flat, primary spring comprising a plurality of leaves, a secondary spring lying in substantially the same vertical plane as the primary spring, means for spacing said springs adjacent their central portions, friction-preventing means interposed between said springs adjacent the end of one of them and spacing said springs relatively, a bracket slidably carried by said primary spring and embracing said friction-preventing means, links pivoted on said bracket and extending above the same, a controlling spring overlying said primary spring and connected to said links and a sustaining spring connected to said bracket.

25. A spring structure including an elongated, normally flat, primary spring comprising a plurality of leaves, a secondary spring lying in substantially the same vertical plane as the primary spring, means for spacing said springs adjacent their central portions, friction-preventing means interposed between said springs adjacent the end of one of them and spacing said springs relatively, a bracket slidably carried by said primary spring and embracing said friction-preventing means, links pivoted on said bracket and extending above the same, a controlling spring overlying said primary spring and connected to said links, a sustaining spring connected to said bracket, and means for connecting said controlling spring to said sustaining spring to maintain the same normally in spaced relation with respect to the primary spring.

26. A spring structure including an elongated, normally flat, primary spring comprising a plurality of leaves, a secondary spring lying in substantially the same vertical plane as the primary spring, means for spacing said springs adjacent their central portions, friction-preventing means interposed between said springs adjacent the end of one of them and spacing said springs relatively, a bracket slidably carried by said primary spring and embracing said friction-preventing means, links pivoted on said bracket and extending above the same, a controlling spring overlying said primary spring and connected to said links, a sustaining spring connected to said bracket, and means for connecting said controlling spring to said sustaining spring to maintain the same normally in spaced relation with respect to the primary spring intermediate of their ends.

27. A spring structure including an elongated, normally flat, primary spring comprising a plurality of leaves, a secondary spring lying in substantially the same vertical plane as the primary spring, means for spacing said springs adjacent their central portions, friction-preventing means interposed between said springs adjacent the end of one of them and spacing said springs relatively, a bracket slidably carried by said primary spring and embracing said friction-preventing means, links pivoted on said bracket and extending above the same, a controlling spring overlying said primary spring and connected to said links, and a sustaining spring having its ends curved and connected to said bracket at the pivotal points of said links.

28. A spring structure including a primary spring comprising a plurality of leaves, one of which is bent over at its ends and embraces the end of another of the leaves, a secondary spring spaced from said primary spring, the ends of said secondary spring having a sliding movement in relation to said primary spring, means for spacing said primary and secondary springs intermediate of their ends, means adjacent the sliding ends of said secondary springs for spacing the same from the primary spring and including an antifriction instrumentality, a bracket carried by said primary spring and having pendant portions, a pivot carried by said portions, links connected to said pivot, a controlling spring overlying and normally spaced from said primary spring and pivotally connected to said links, and a sustaining spring having curved portions attached to the pivot in said pendant portions of the bracket.

29. A spring structure including a primary spring comprising a plurality of leaves, one of which is bent over at its ends and embraces the ends of another of the leaves, a secondary spring spaced from said primary spring, the ends of said secondary spring having a sliding movement in relation to said primary spring, means for spacing said springs intermediate of their ends, means adjacent the sliding ends of said secondary springs for spacing the same from the primary spring and including an anti-friction instrumentality, a bracket carried by said primary spring and having pendant portions, a pivot carried by said portions, links connected to said pivot, a controlling spring overlying and normally spaced from said primary spring and pivotally connected to said links, and a sustaining spring having curved portions attached to the pivot in said pendant portions of the bracket and comprising a plurality of leaves rigidly connected at their ends and maintained in contacting relation throughout their length normally and under stress.

30. A primary spring, a double scroll sustaining spring connected at its ends to the under-portion of the primary spring by a sliding bracket-device, an auxiliary spring-member underlying and connected to the primary spring but in spaced-apart relation thereto by a bracket-device intermediate of its ends and the center-portion, and a controlling spring-member connected at its ends to a swivel bracket-device connected at the ends of the primary spring and to the sustaining spring.

31. A primary spring composed of a plurality of spring leaves, the uppermost one being longer and bent over at its ends, a double scroll sustaining spring connected to the primary spring but in spaced-apart relation thereto, an auxiliary spring-member connected to the primary spring at its ends by a sliding bracket-member connecting the ends of the sustaining spring and the auxiliary spring to the primary spring, and a controlling spring connected at its ends by a swivel bracket and fulcruming on the bolt-connection of the sliding bracket-member.

WILLIAM E. ANDREW.

Witnesses:
EDMUND H. PARRY,
A. M. PARKINS.